(12) United States Patent
Sakai et al.

(10) Patent No.: US 8,873,111 B2
(45) Date of Patent: Oct. 28, 2014

(54) IMAGE READING DEVICE, IMAGE PROCESSING METHOD AND COMPUTER READABLE MEDIUM

(75) Inventors: Masakazu Sakai, Ishikawa (JP);
Masaaki Sakai, Ishikawa (JP);
Yoshikazu Morita, Ishikawa (JP);
Yoshiro Kawamoto, Ishikawa (JP);
Yoshifumi Nomura, Ishikawa (JP)

(73) Assignee: PFU Limited, Ishikawa (JP)

( * ) Notice: Subject to any disclaimer, the term of this patent is extended or adjusted under 35 U.S.C. 154(b) by 54 days.

(21) Appl. No.: 13/469,405

(22) Filed: May 11, 2012

(65) Prior Publication Data

US 2012/0287482 A1    Nov. 15, 2012

(30) Foreign Application Priority Data

May 13, 2011   (JP) ................................ 2011-108142

(51) Int. Cl.
*H04N 1/04*    (2006.01)
*H04N 1/00*    (2006.01)
*H04N 1/60*    (2006.01)

(52) U.S. Cl.
CPC ....... *H04N 1/00718* (2013.01); *H04N 1/00737* (2013.01); *H04N 1/00753* (2013.01); *H04N 1/00774* (2013.01); *H04N 1/60* (2013.01); *H04N 1/0763* (2013.01)
USPC ............ 358/474; 358/475; 358/497; 358/498

(58) Field of Classification Search
USPC .......................... 358/474, 475, 497, 498, 461
See application file for complete search history.

(56) References Cited

U.S. PATENT DOCUMENTS

| 5,969,371 A | 10/1999 | Andersen |
| 2001/0014183 A1* | 8/2001 | Sansom-Wai et al. ........ 382/289 |
| 2006/0082849 A1* | 4/2006 | Kaku ............................ 358/537 |

FOREIGN PATENT DOCUMENTS

| JP | 64036169 A | 2/1989 | |
| JP | 02-274165 | 11/1990 | |
| JP | 06-209398 | 7/1994 | |
| JP | 06209398 A | 7/1994 | |
| JP | 09-065061 | * 3/1997 | ............... H04N 1/04 |
| JP | 10079836 A | 3/1998 | |
| JP | 11041416 A | 2/1999 | |
| JP | 2006-211046 | 8/2006 | |
| JP | 2010-074529 A | 4/2010 | |
| JP | 2010-141857 A | 6/2010 | |

OTHER PUBLICATIONS

Chinese Office Action corresponding to Application No. 201210147665.6 dated Apr. 21, 2014.
Japanese Office Action corresponding to Japanese Application No. 2011-108142 dated Sep. 2, 2014. [English Translation].

* cited by examiner

*Primary Examiner* — Houshang Safaipour
(74) *Attorney, Agent, or Firm* — Hogan Lovells US LLP

(57) ABSTRACT

There is provided an image reading device comprising: a image capturing unit that captures a manuscript; a predetermined image pattern displayed in a region that is captured by the image capturing unit and provides a background of the manuscript; and a region determination unit that determines an image region corresponding to the manuscript, based on an image element corresponding to the image pattern and another image element corresponding to a shadow of the manuscript in an image captured by the image capturing unit.

7 Claims, 12 Drawing Sheets

Fig. 2
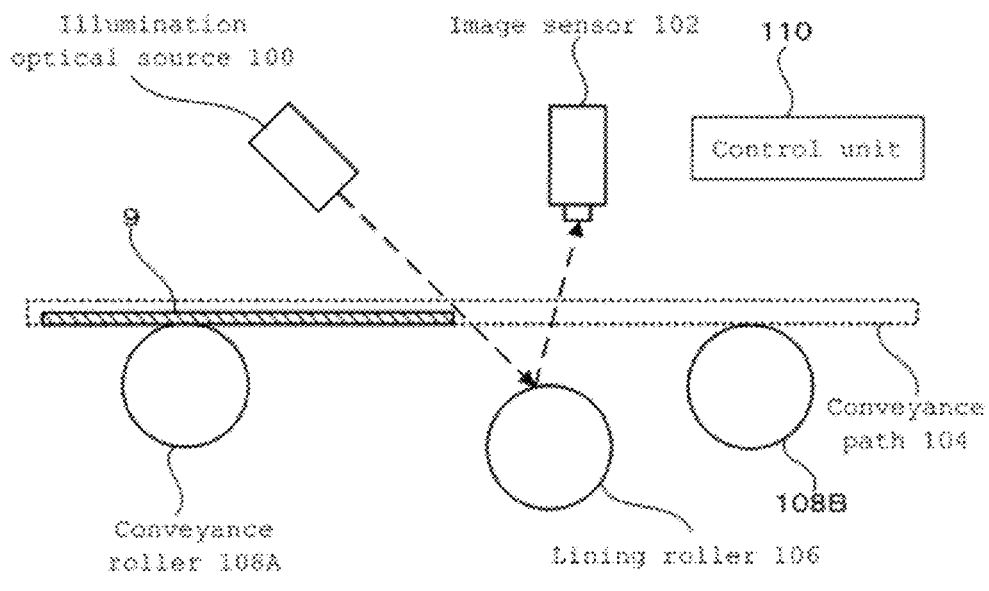
(A) Vicinity of photographing position of scanner 1
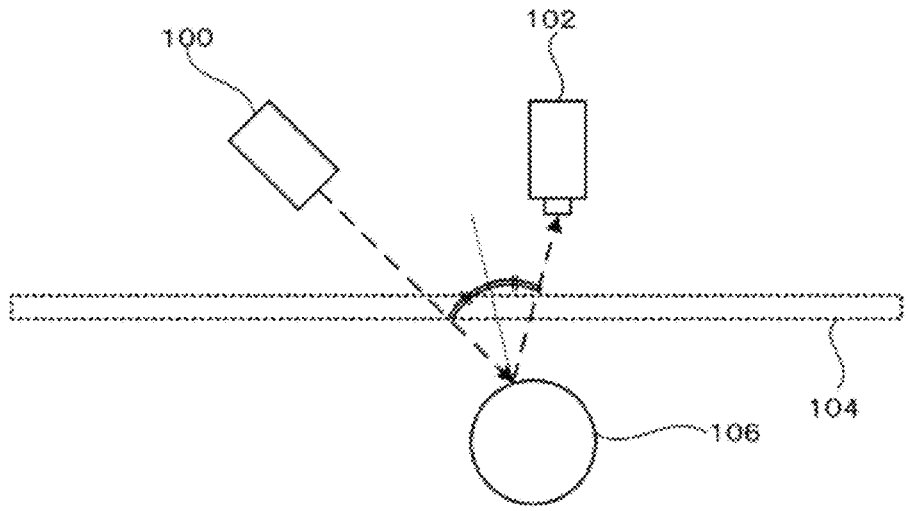
(B) Positional relationship among illumination optical source, lining roller, and image sensor Method for identifying manuscript image edge Read image 90 in a case where background is white line against black background Read image 90 in a case where background is oblique line pattern Fig. 9
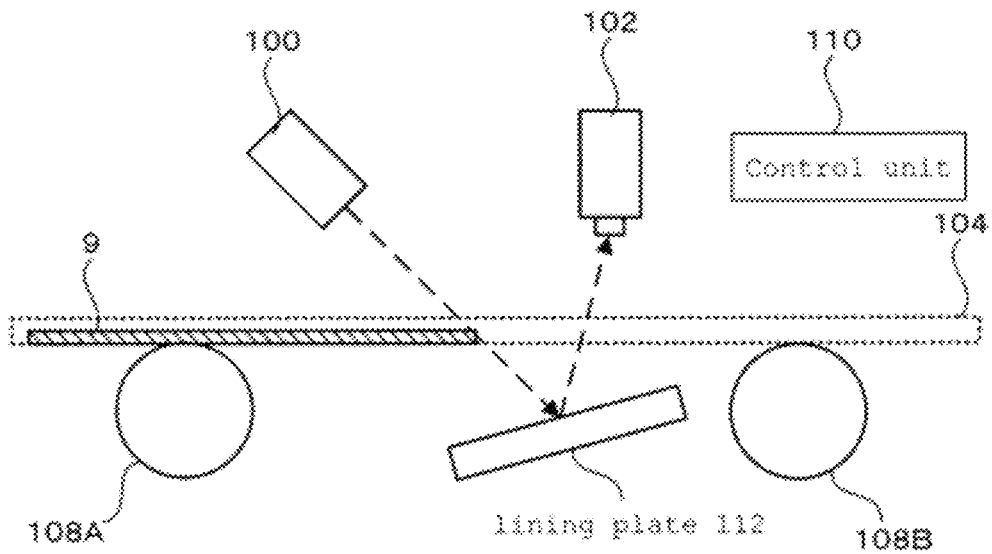
(A) Case where pattern is generated by controlling turning-on of lining
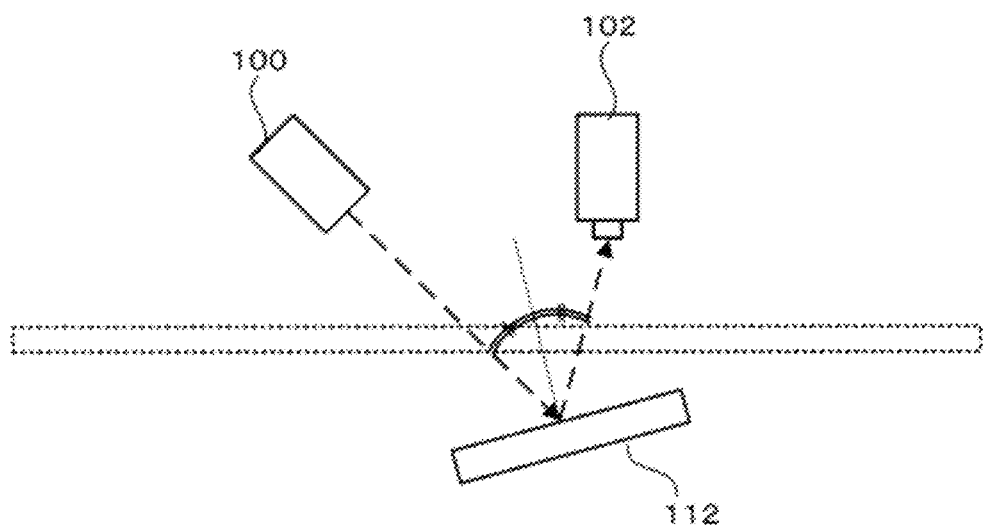
(B) Positional relationship among illumination optical source, lining, and image sensor Read image 90 in a case where pattern is generated by controlling turning-on of lining

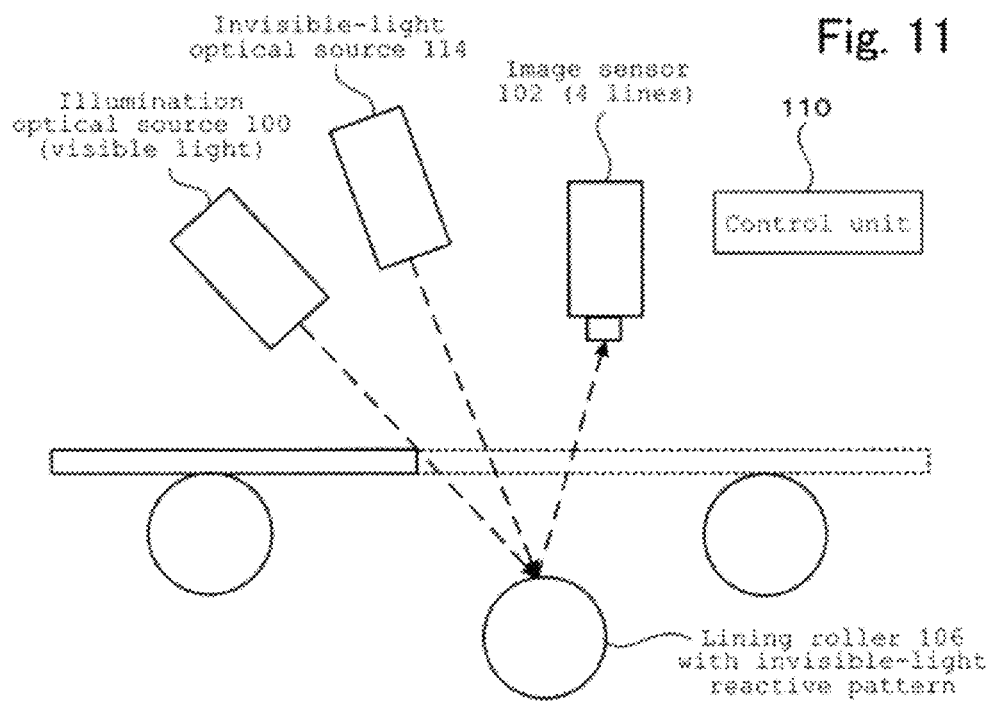
(A) Mode for utilizing invisible-light pattern
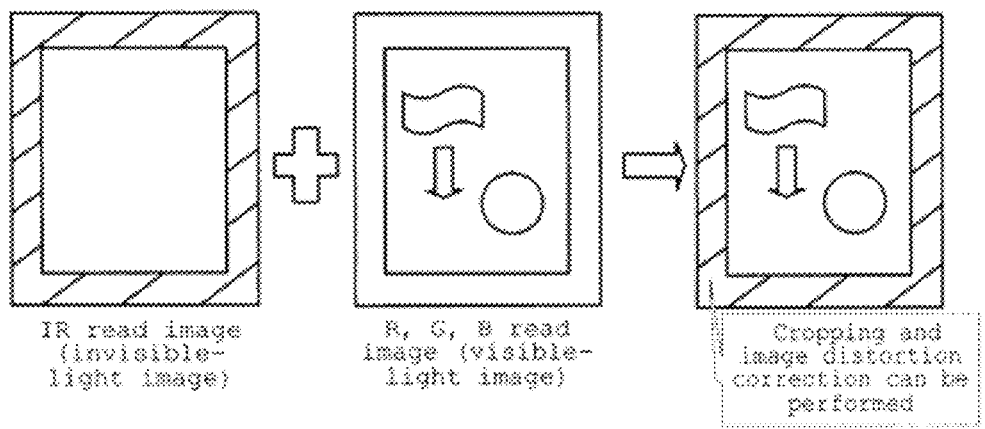
(B) Invisible-light image and visible-light image
Fig. 11

Read image 90 in a case where pattern is generated by controlling turning-on of illumination optical source

IMAGE READING DEVICE, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2011-108142 filed May 13, 2011.

BACKGROUND OF THE INVENTION

Field of the Invention

The present invention relates to an image reading device.

SUMMARY OF THE INVENTION

According to an aspect of the invention, there is provided an image reading device comprising: an image capturing unit that captures a manuscript; a predetermined image pattern displayed in a region that is captured by the image capturing unit and provides a background of the manuscript; and a region determination unit that determines an image region corresponding to the manuscript, based on an image element corresponding to the image pattern and another image element corresponding to a shadow of the manuscript in an image captured by the image capturing unit.

According to another aspect of the invention, there is provided an image processing method comprising the steps of: extracting an image element corresponding to a predetermined image pattern from an captured image; extracting another image element corresponding to a shadow of a manuscript from the captured image; and determining an image region corresponding to the manuscript in the captured image based on the extracted image element corresponding to the image pattern and the extracted image element corresponding to the shadow of the manuscript.

According to another aspect of the invention, there is provided a non-transitory computer-readable medium storing thereon a computer program used in a computer, the computer program causing the computer to perform the steps of: extracting an image element corresponding to a predetermined image pattern from an captured image; extracting another image element corresponding to a shadow of a manuscript from the captured image; and determining an image region corresponding to the manuscript in the captured image based on the extracted image element corresponding to the image pattern and the extracted image element corresponding to the shadow of the manuscript.

BRIEF DESCRIPTION OF THE DRAWINGS

Exemplary embodiments of the present invention will be described in detail based on the following figures, wherein:

FIG. 2(A) is a schematic explanatory view of an inside of the scanner 1;

FIG. 2(B) is an explanatory view of a positional relationship among an illumination optical source 100, a lining roller 106, and an image sensor 102;

FIG. 9 (A) is a schematic explanatory view of an inside of the scanner 1 in variant 4;

FIG. 9(B) is an explanatory view of a positional relationship among the illumination optical source 100, a lining plate 112, and the image sensor 102 in variant 4;

FIG. 11(A) is a schematic explanatory view of the inside of the scanner 1 in variant 5;

FIG. 11(B) is a diagram exemplifying a read image which is picked up by the scanner 1 in variant 5.

DESCRIPTION OF THE PREFERRED EMBODIMENTS

The following will describe an embodiment of the present invention with reference to the drawings.

Figure 1:
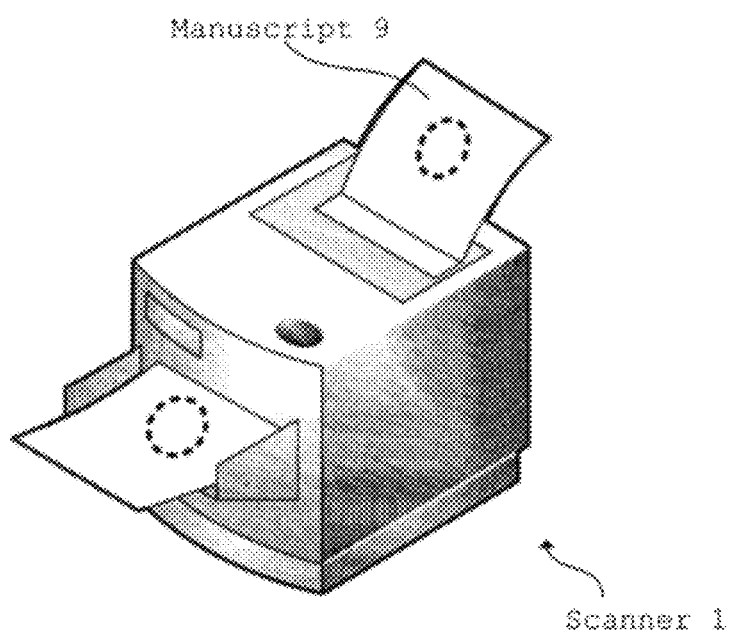
FIG. 1 is an illustrative view schematically showing an overall configuration of a scanner 1.

FIG. 1 schematically shows an overall configuration of a scanner 1. The scanner 1 is one example of an image reading device according to the present invention.

As exemplified in FIG. 1, the scanner 1 is a document scanner including an Auto Document Feeder (ADF) and conveys a manuscript 9 to a read position (capturing position) and reads a manuscript image from the conveyed manuscript 9.

FIG. 2(A) is a schematic explanatory view of an inside (vicinity of the read position (capturing position)) of the scanner 1 and FIG. 2(B) is an explanatory view of a positional relationship among an illumination optical source 100, a lining roller 106, and an image sensor 102.

As exemplified in FIG. 2(A), the scanner 1 includes the illumination optical source 100, the image sensor 102, a conveyance path 104, a lining roller 106, a conveyance roller 108, and a control unit 110.

The illumination optical source 100 obliquely irradiates the manuscript 9, which is a medium to be captured, with light in a visible region and may come in, for example, a 3-color LED array having 3 LEDs of red, green, and blue LEDs or a white LED. The illumination optical source 100 in the present embodiment is arranged in a direction (main scanning direction) perpendicular to a direction (vertical scanning direction) in which the manuscript 9 is conveyed, to irradiate the surface of the manuscript 9 with light obliquely from the upstream side to the downstream side in the vertical scanning direction (manuscript conveyance direction).

The image sensor 102 is one example of capturing unit according to the present invention and comes in, for example, a line sensor in which Charge Coupled Devices (CCDs) are arranged. The image sensor 102 receives light emitted from the illumination optical source 100 and reflected by the manuscript 9, etc. and converts it into an electric signal, thereby reading an image of the surface of the manuscript and its surrounding. The image sensor 102 in the present embodiment includes a red line sensor with a red filter, a green line sensor with a green filter, and a blue line sensor with a blue filter.

The conveyance path 104 is a path to convey the manuscript 9; specifically, the manuscript 9 on the conveyance path 104 is conveyed by a plurality of conveyance rollers 108 (conveyance rollers 108A and 108B). The image sensor 102 in the present embodiment reads images at a frequency that corresponds to a conveyance speed (that is, driving speed) of the conveyance roller 108.

The lining roller 106 is one example of a lining member according to the present invention and is placed at a position separate from the conveyance path 104. A distance between the lining roller 106 and the conveyance path 104 only needs to be large enough to highlight a shadow of the manuscript 9 projected to the lining roller 106.

On the surface of the lining roller 106, an image pattern is formed. On the surface of the lining roller 106 in the present embodiment, a black lattice pattern against a white background is printed as exemplified in FIG. 4. The lining roller 106 rotates at a speed that corresponds to the conveyance speed of the manuscript 9. That is, the lattice pattern printed on the surface of the lining roller 106 moves in synchronization with the movement of the manuscript 9.

As exemplified in FIG. 2(B), the illumination optical source 100 emits light obliquely downward from above the manuscript conveyance path below which the lining roller 106 is disposed. The lining roller 106 is disposed in a region that provides a background of the manuscript 9 as viewed from the illumination optical source 100. The image sensor 102 is disposed to a position where it can detect light emitted from the illumination optical source 100 and reflected by the surface of the lining roller 106. More specifically, the image sensor 102 is disposed to a position above the conveyance path and directed so that it can detect both light reflected by the manuscript 9 and light reflected by the lining roller 106 from this position.

The control unit 110 is a computer that controls the components of the scanner 1 and mounted, for example, inside the scanner 1. A control program 5 exemplified in FIG. 3 is installed in the control unit 110 in the present embodiment to implement an image processing method according to the present invention.

Figure 3:
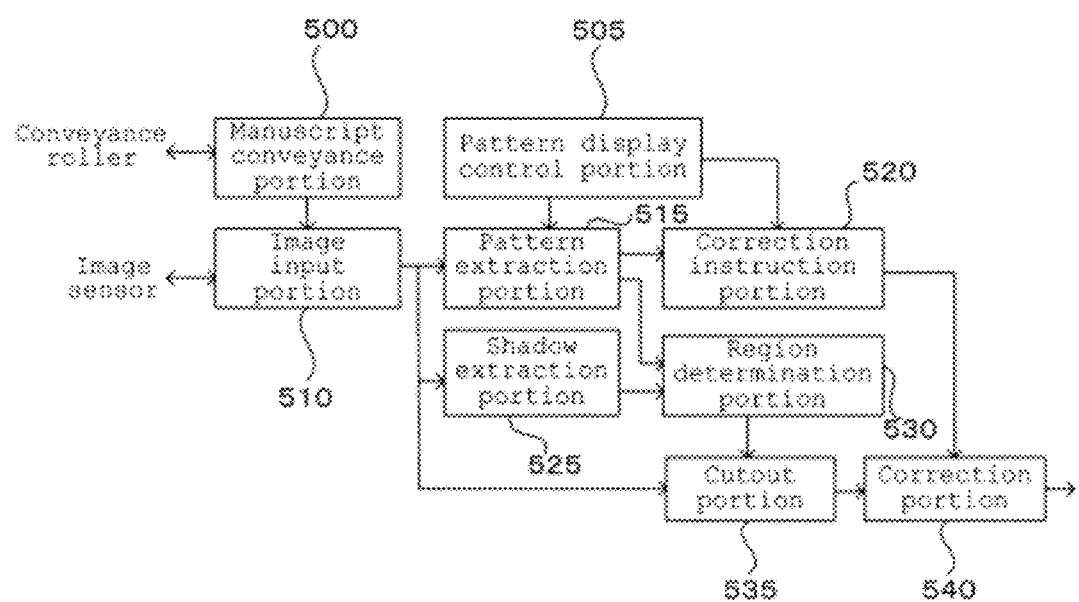
FIG. 3 is a diagram exemplifying a function configuration of a control program 5 which is installed in a control unit 110.

FIG. 3 is a diagram exemplifying a function configuration of the control program 5 which is installed in a control unit 110.

As exemplified in FIG. 3, the control program 5 has a manuscript conveyance portion 500, a pattern display control portion 505, an image input portion 510, a pattern extraction portion 515, a correction instruction portion 520, a shadow extraction portion 525, a region determination portion 530, a cutout portion 535, and a correction portion 540.

In the control program 5, the manuscript conveyance portion 500 controls the conveyance roller 108, to convey the manuscript 9 on the conveyance path 104. The manuscript conveyance portion 500 notifies the image input portion 510 of a state (conveyance start, rotation speed, or conveyance end) of the conveyance roller 108.

The pattern display control portion 505 displays a predetermined image pattern in the background region of a manuscript, corresponding to a conveyance speed of the manuscript. The pattern display control portion 505 in the present embodiment rotates the lining roller 108, corresponding to the conveyance speed of the manuscript. The manuscript conveyance speed may be measured by any other sensor such as a motion sensor or detected by a roller driven by the manuscript being conveyed.

The image input portion 510 controls the image sensor 102 so that it may capture the manuscript 9 being conveyed on the conveyance path 104. If the image of manuscript 9 is captured, an image pattern of the lining roller 106 in its background region is also captured.

When a notification of start of manuscript conveyance is made by the manuscript conveyance portion 500, the image input portion 510 in the present embodiment allows the image sensor 102 to start capturing so that the main scanning line may be captured repeatedly at a frequency corresponding to a rotation speed of the conveyance roller 106; and when a notification of end of the manuscript conveyance is made, the image input portion 510 ends the capturing.

The pattern extraction portion 515 extracts an image element corresponding to the predetermined image pattern from an image picked up by the image input portion 510. The image element refers to one portion of the picked-up image. The pattern extraction portion 515 in the present embodiment extracts a black lattice pattern from the background region.

The correction instruction portion 520 generates correction instruction information based on the image pattern extracted by the pattern extraction portion 515. The correction instruction information includes at least one of the followings: information denoting whether correction is necessary, information specifying an image region that needs to be corrected, and information specifying a correction amount. The correction instruction portion 520 in the present embodiment instructs the correction portion 540 to perform image correction for reducing image distortion due to fluctuations in conveyance speed of the manuscript based on distortion in the image pattern extracted by the pattern extraction portion 515.

The shadow extraction portion 525 extracts an image element corresponding to a shadow of the manuscript 9 from the image picked up by the image input portion 510. For example, the shadow extraction portion 525 extracts the image element corresponding to the shadow based on its density difference from the manuscript 9.

The region determination portion 530 determines an image region corresponding to the manuscript 9 based on the image pattern extracted by the pattern extraction portion 515 and the shadow of the manuscript 9 extracted by the shadow extraction portion 525. More specifically, the region determination portion 530 determines the image region of the manuscript 9 based on a region in which the image pattern (lattice pattern) is made invisible by the manuscript 9 and on the region where the shadow is extracted.

The cutout portion 535 cuts out the image of the manuscript 9 (that is, manuscript image 900) from the image picked up by the image input portion 510 in accordance with the image region determined by the region determination portion 530.

In response to the correction instruction information generated by the correction instruction portion 520, the correction portion 540 performs correction processing on the manuscript image 900 cut out by the cutout portion 535.

Figure 4:
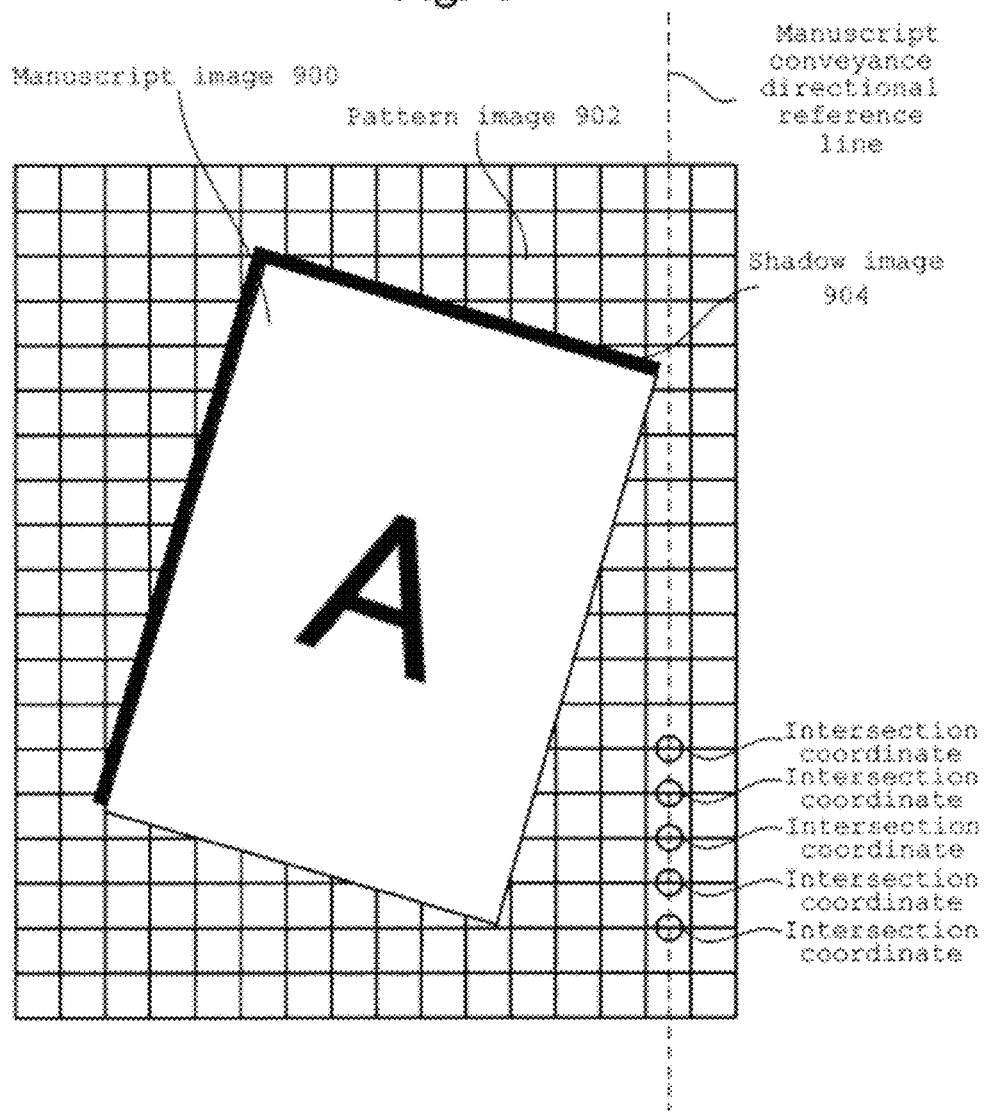
FIG. 4 is an explanatory view of a method for generating correction instruction information from a read image 90 which is captured by an image sensor 102.
Figure 5:
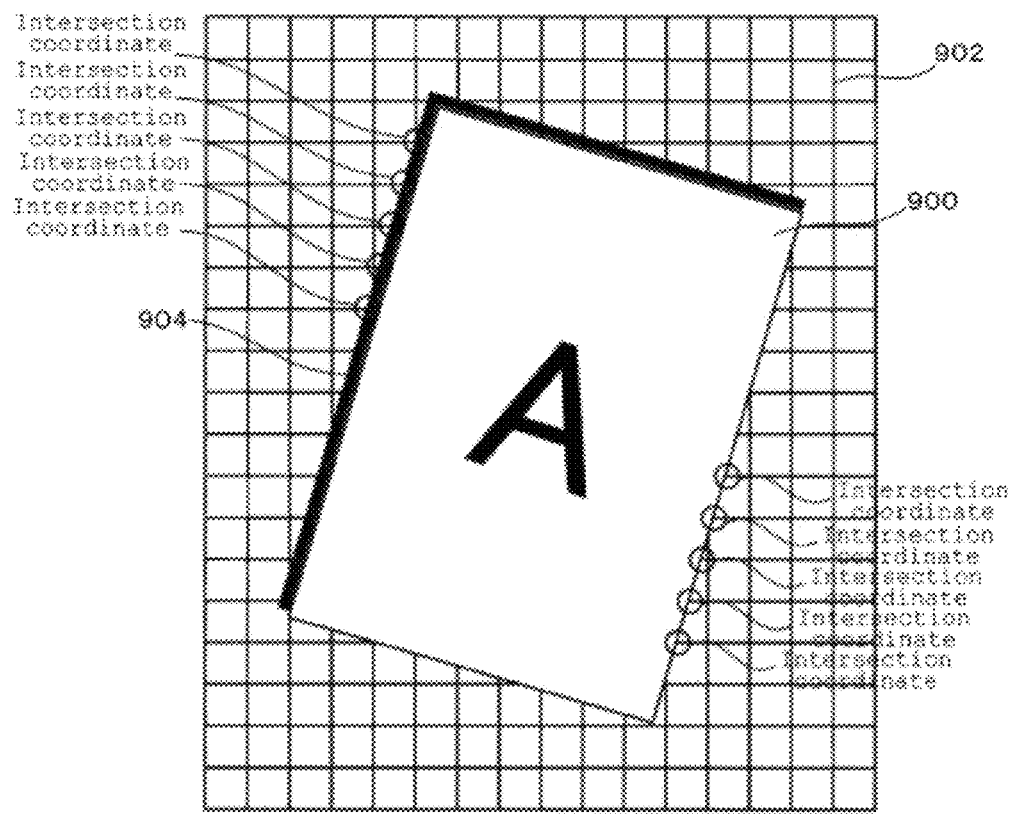
FIG. 5 is an explanatory view of a method for determining an image region of a manuscript image from the read image 90 which is captured by the image sensor 102.

FIGS. 4 and 5 exemplify a read image 90 which is captured by the image sensor 102 (image input portion 510). As exemplified in FIG. 4, the read image 90 includes the manuscript image 900 which corresponds to the manuscript 9, a pattern image 902 which lies in the background region of the manuscript 9, and a shadow image 904 which corresponds to a shadow generated by the manuscript 9. The manuscript image 900 may tilt with respect to the manuscript conveyance direction (vertical scanning direction). Further, even if the image pattern (lattice pattern) of the lining roller 106 is of equal spacing, the pattern image 902 may be subject to a change in pattern interval owing to fluctuations in conveyance speed of the manuscript 9. Further, the shadow image 904 has an edge (upper side in the figure) liable to be shadowed and an edge (lower side in the figure) not liable to be shadowed depending on the direction of irradiation by the illumination optical source 100.

As exemplified in FIG. 5, in regions where the shadow image 904 and the pattern image 902 overlap each other, the region determination portion 530 determines that the region where the pattern is invisible due to the shadow is an outer edge of the manuscript image 900. In such a manner, even if the manuscript 9 includes an image element similar to the image pattern (lattice pattern) of the lining roller 106, the region determination portion 530 can identify the outer edge of the manuscript image 900. Further, in region where the shadow image 904 does not exist, the region determination portion 530 determines that the region in which the pattern is invisible due to the manuscript 9 is an outer edge of the manuscript 900. If the manuscript 9 includes an image element similar to the image pattern (lattice pattern) of the lining roller 106, the region determination portion 530 estimates an outer edge of the manuscript 900 in the region where the shadow image 904 does not exist, based on the outer edge identified by using the shadow image 904 and the pattern image 902.

Further, as exemplified in FIG. 4, the correction instruction portion 520 measures the interval of the pattern image 902 on a reference line preset in the manuscript conveyance direction and, based on the measured distortion (expansion or contraction) of the pattern image 902, generates correction instruction information directing image correction that offsets the expansion or contraction.

As described hereinabove, the scanner 1 in the present embodiment captures the manuscript 9 while rotating the lining roller 106 corresponding to a conveyance speed of the manuscript 9, extracts the shadow image 904 and the pattern image 902 from the picked up image, determines an image region of the manuscript image 900 based on the extracted shadow image 904 and pattern image 902, and cuts it out. In such a manner, even if the manuscript 9 includes a pattern similar to the image pattern, the image region can be determined. Further, even in the case of a manuscript or region that is not liable to be shadowed by the manuscript, the image region can be estimated on the basis of the pattern image 902. In particular, in the present embodiment, the lining roller 106 is separated from the conveyance path 104 and, moreover, the illumination optical source 100 irradiates the manuscript 9 with light obliquely, so that the shadow in a specific region (upper side in FIG. 4) is highlighted to mostly eliminate the shadows in the other regions; however, the image region of the manuscript image is determined more accurately by combining the pattern image 902 and the shadow image 904.

Further, the scanner 1 in the present embodiment corrects distortion in an image owing to fluctuations in manuscript conveyance speed based on a pattern of the image formed on the lining roller 106.

[Variant 1]

Next, a description will be given of variants of the embodiment.

Figure 6:
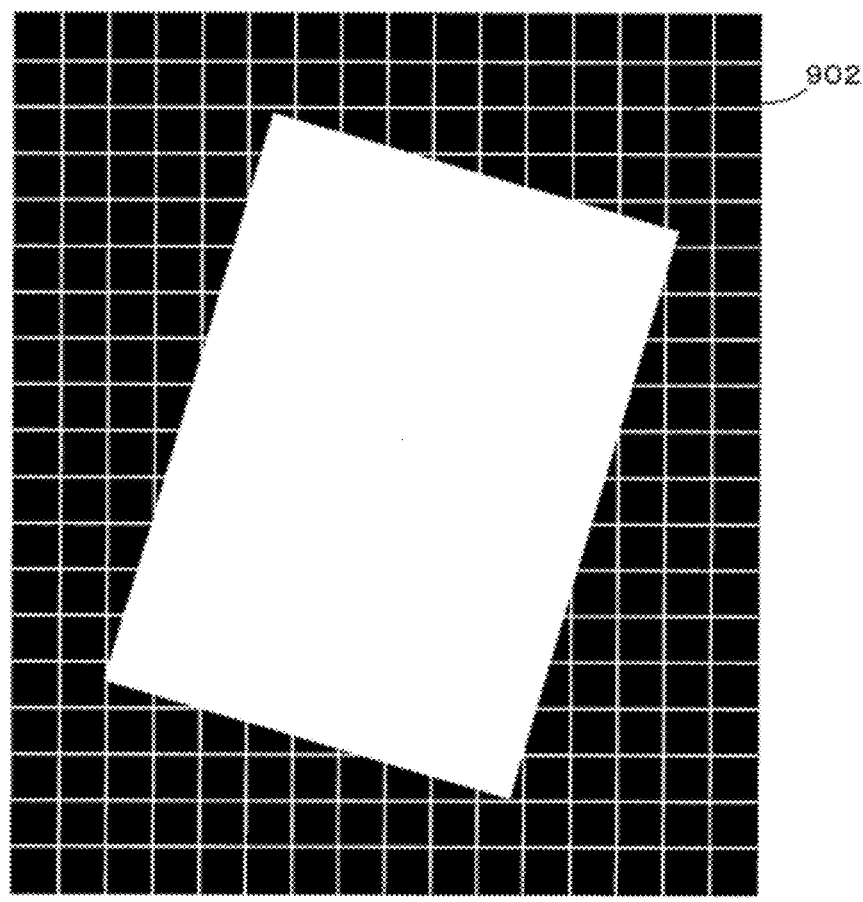
FIG. 6 is an illustrative view exemplifying an image pattern in variant 1.

FIG. 6 is an illustrative view exemplifying an image pattern in variant 1.

As exemplified in FIG. 6, an image pattern formed on the lining roller 106 is black-and-white-reversed as compared to the image pattern in the embodiment and hence has a white lattice pattern against a black background. In this case, the scanner 1 can easily distinguish between a shadow and pattern lines and, therefore, can easily determine a region of a manuscript image.

[Variant 2]

Figure 7:
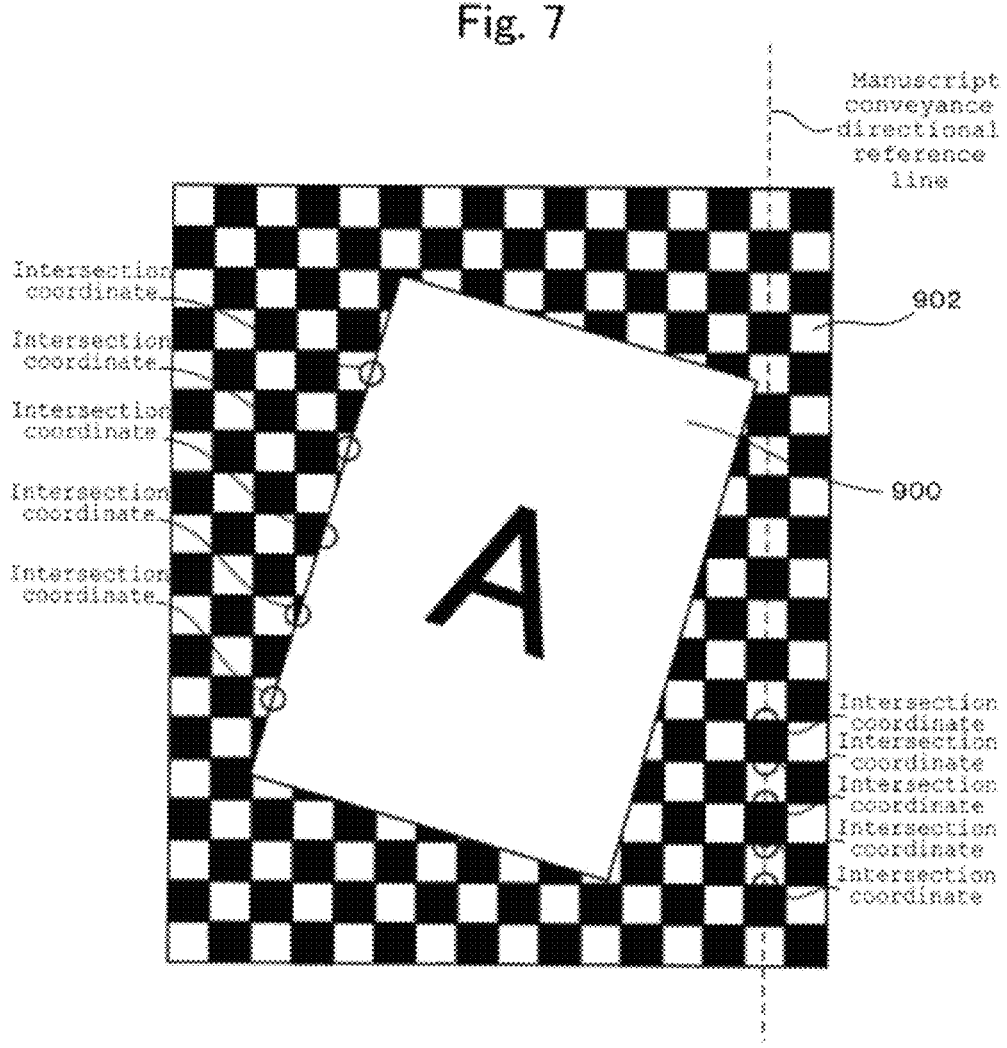
FIG. 7 is an illustrative view exemplifying an image pattern in variant 2.

FIG. 7 is an illustrative view exemplifying an image pattern in variant 2.

As exemplified in FIG. 7, an image pattern formed on the lining roller 106 may be a back-and-white checkered pattern. In this case, a white rectangular region and a black rectangular region alternate, so that the scanner 1 checks a shadow of a manuscript and determines that a region in which a frequency of repetition between the white rectangular region and the black rectangular region becomes turbulent is an outer edge of an image of the manuscript.

Further, the correction instruction portion 520 measures the interval of the checkered pattern image 902 on the reference line preset in the manuscript conveyance direction and, based on the measured distortion (expansion or contraction) of the pattern mage 902, generates correction instruction information directing image correction that offsets the expansion or contraction.

[Variant 3]

Figure 8:
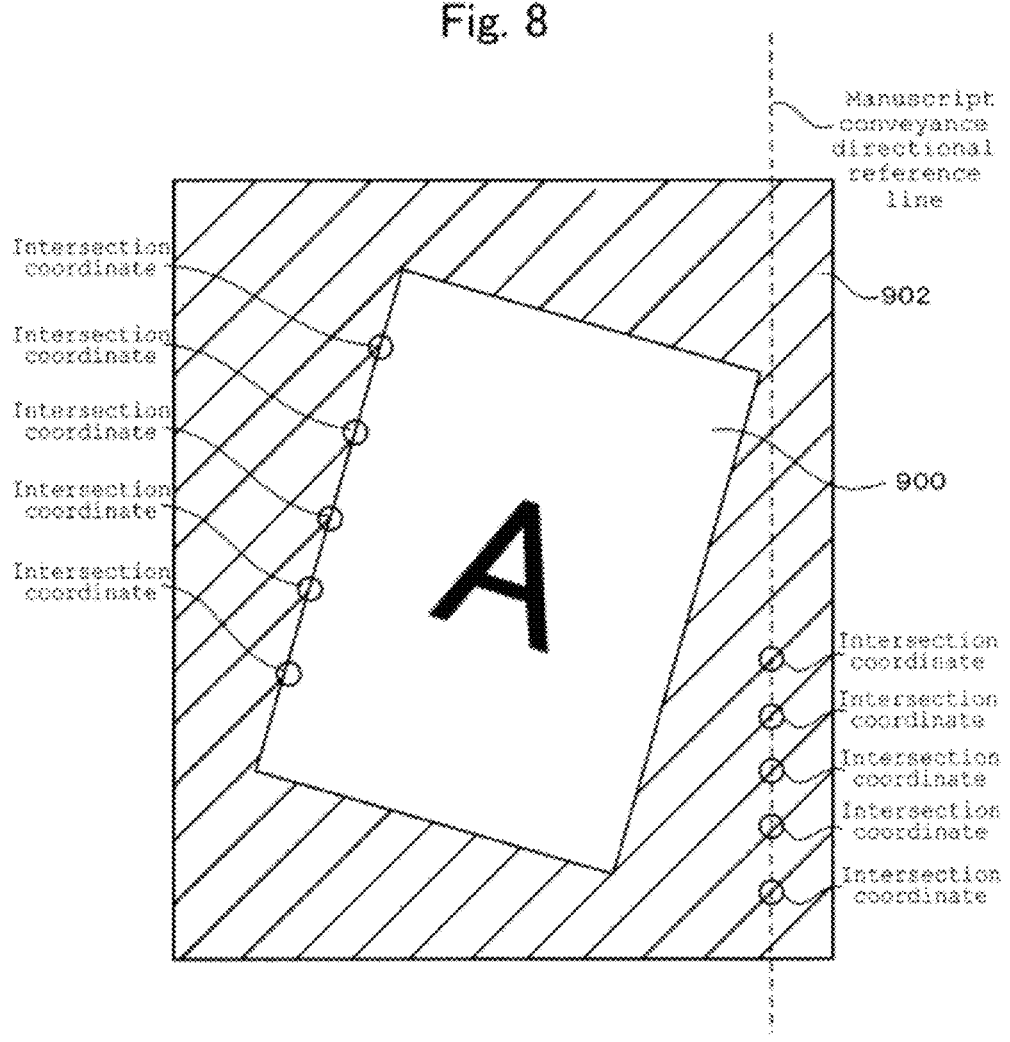
FIG. 8 is an illustrative view exemplifying an image pattern in variant 3.

FIG. 8 is an illustrative view exemplifying an image pattern in variant 3.

As exemplified in FIG. 8, the image pattern formed on the lining roller 106 may be an oblique line pattern which is formed obliquely with respect to the main scanning direction and the vertical scanning direction. In this case, the scanner 1 searches for straight lines of the oblique line pattern starting from the peripheral border of a read image and follows the found straight line toward the midsection of the read image to search for an intersection of this straight line and the shadow of a manuscript. The scanner 1 determines that the intersection of the straight line of the oblique line pattern and the manuscript shadow is an outer edge of the manuscript image.

The scanner 1 can preset a reference line in the manuscript conveyance direction, thereby determining an amount of image distortion correction as in the case of the embodiment.

[Variant 4]

FIG. 9(A) is a schematic explanatory view of an inside of the scanner 1 in variant 4 and FIG. 9(B) is an explanatory view of a positional relationship among the illumination optical source 100, a lining plate 112, and the image sensor 102 in variant 4.

As exemplified in FIG. 9(A), the scanner 1 in variant 4 has a configuration in which the lining roller 106 in FIG. 2 is replaced by the lining plate 112. The lining plate 112 is one example of the lining member according to the present invention.

As exemplified in FIG. 9(B), the lining plate 112 is mounted at such an angle that light emitted from the illumination optical source 100 may be reflected toward the image sensor 102.

Further, the lining plate 112 has a light emitting device mounted on its surface (upper side surface in the figure). The light emitting device mounted on the lining plate 112 is, for example, a plurality of LED lamps which are arranged in the main scanning direction (direction perpendicular to the manuscript conveyance direction).

Figure 10:
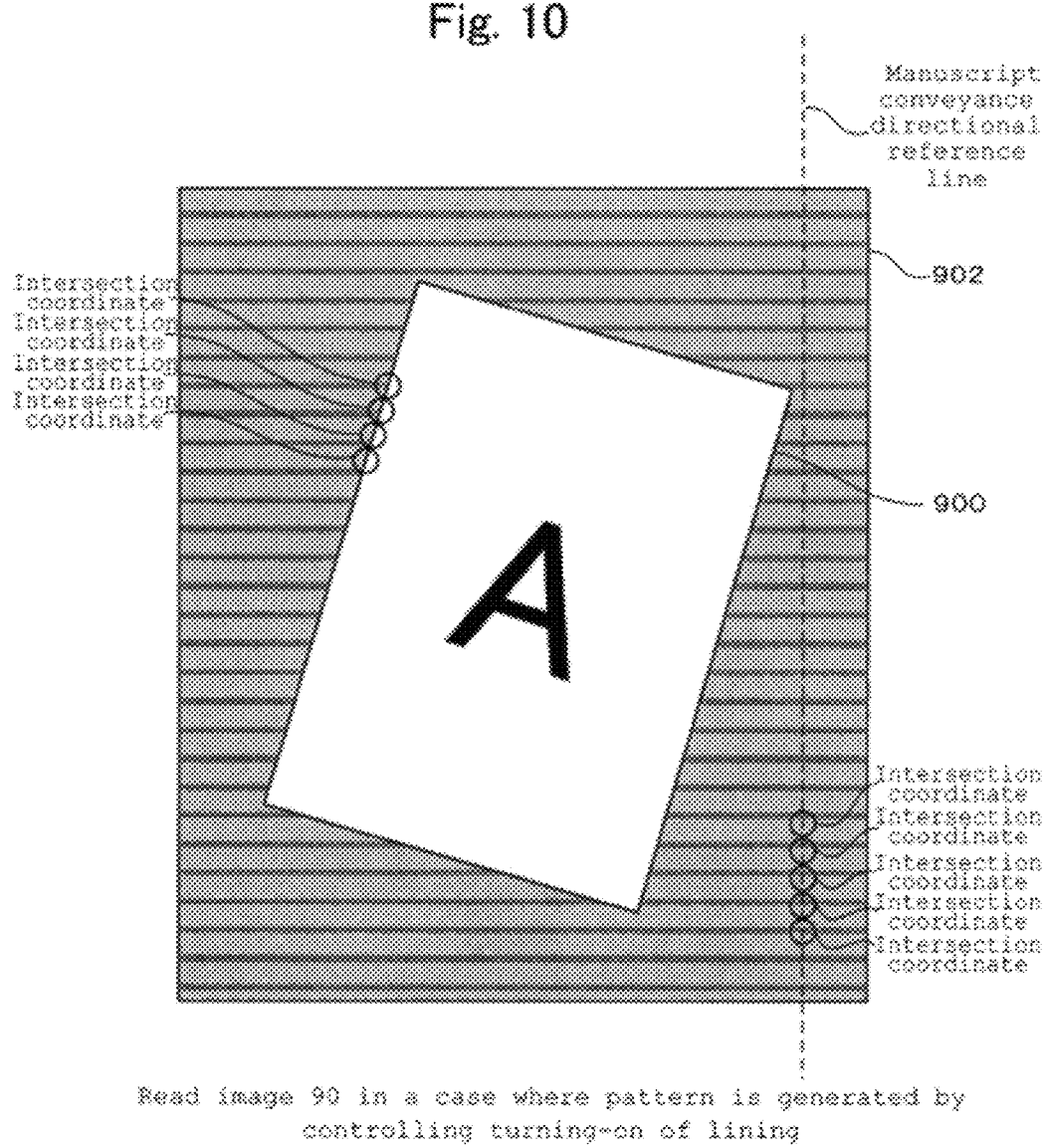
FIG. 10 is an illustrative view exemplifying a read image in variant 4.

The pattern display control portion 505 in the present variant turns on the light emitting device mounted on the lining plate 112 at a frequency corresponding to a manuscript conveyance speed, thereby embedding an image pattern formed at a predetermined frequency into the read image 90 as exemplified in FIG. 10.

The scanner 1 in the present variant searches for an intersection of the periodic image pattern embedded into the read image 90 and the manuscript or manuscript shadow and determines an image region of the manuscript image 900 based on the found intersection as exemplified in FIG. 10.

[Variant 5]

FIG. 11(A) is an explanatory view of the inside of the scanner 1 in variant 5 and FIG. 11(B) is a diagram exemplifying a read image which is picked up by the scanner 1 in variant 5.

As exemplified in FIG. 11(A), the scanner 1 in variant 5 has a configuration in which an invisible-light optical source 114 is added to the components in FIG. 2. The invisible-light optical source 114 is the same as the illumination optical source 100 except that it emits invisible light. The invisible light emitted from the invisible-light optical source 114 may be ultraviolet light or infrared light, which are invisible. The invisible-light optical source 114 in the present variant emits infrared light.

Further, the image sensor 102 in the present variant has a line sensor capable of detecting invisible light. The image sensor 102 includes an invisible light line sensor for detecting infrared light in addition to a red line sensor, a green line sensor, and a blue line sensor.

Further, on the surface of the lining roller 106, an image pattern is printed using ink that cannot be seen with visible light and reflects or absorbs invisible light. On the lining roller 106 in the present variant, an image pattern is formed using ink that cannot be seen with infrared light.

As exemplified in FIG. 11(B), the scanner 1 in variant 5 reads an infrared-light (IR) read image (invisible-light image) and a visible-light image containing red, green, and blue. The pattern extraction portion 515 in the present variant extracts a pattern image from the invisible-light image, while the shadow extraction portion 525 extracts a shadow image from the invisible-light image or the visible-light image. The region determination portion 530 in the present variant determines the image region of a manuscript image in the visible-light image based on the pattern image extracted from the invisible-light image and the shadow image extracted from the invisible-light image or the visible-light image.

Further, the correction instruction portion 520 determines a correction amount based on the pattern image extracted from the invisible-light image.

By forming an image pattern by using invisible light in such a manner, it is possible to prevent unnecessary image patterns from being transferred into the manuscript image.

[Variant 6]

Figure 12:
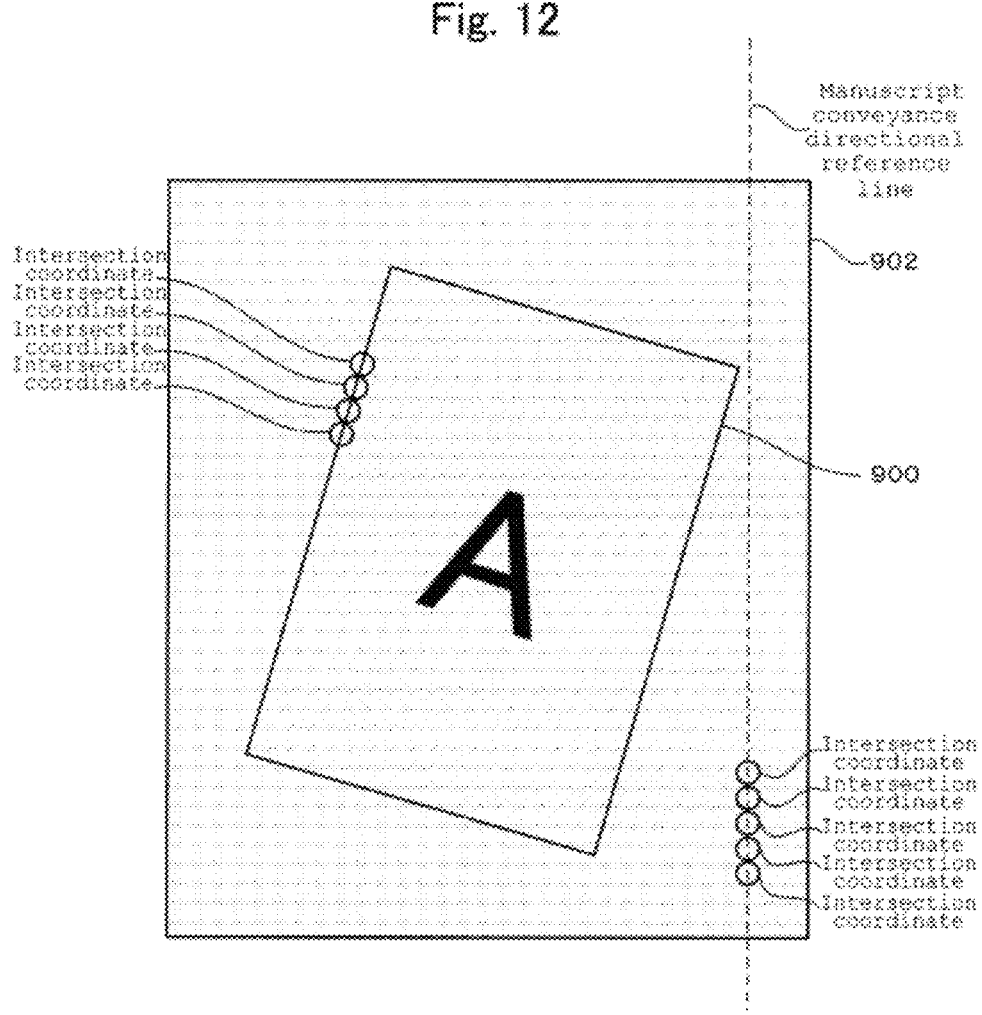
FIG. 12 is an illustrative view exemplifying a read image in a case where the illumination optical source 100 is turned up and down periodically.

FIG. 12 is an illustrative view exemplifying a read image in a case where the illumination optical source 100 is turned up and down periodically.

As exemplified in FIG. 12, the scanner 1 in variant 6 can turn up and down the illumination optical source 100 at a predetermined frequency, thereby forming an image pattern in a read image as in the case of variant 4. By performing almost the same processing as variant 4, the scanner 1 in the present variant cuts out a manuscript image from a read image and performs image correction on the cut-out manuscript image so that the image pattern may be offset. The illumination optical source 100 may be turned up and down by fluctuating the light quantities of all of the color components or fluctuating the light quantity of only a specific color component.

Further, the correction instruction portion 520 measures the interval of a bright-and-dark pattern image on a reference line preset in the manuscript conveyance direction and, based on the measured distortion (expansion or contraction) of the bright-and-dark pattern, generates correction instruction information directing image correction that offsets the expansion or contraction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device for determining an image region of a captured image comprising:
    an image capturing unit that captures a manuscript;
    a predetermined image pattern, wherein the predetermined image pattern is displayed in a region that is captured by the image capturing unit and provides a background of the manuscript;
    a region determination unit that determines an image region corresponding to the manuscript, based on an image element corresponding to the image pattern and another image element corresponding to a shadow of the manuscript in an image captured by the image capturing unit;
    a correction instruction unit that generates correction instruction information based on the image element that corresponds to the image pattern captured by the image capturing unit;
    a correction unit that performs correction processing on the image captured by the image capturing unit based on the correction instruction information generated by the correction instruction unit; and
    a lining roller that is mounted in the vicinity of the capturing position of the image capturing unit and rotates according to a conveyance speed of the manuscript,
    wherein the image pattern is formed on a surface of the lining roller.

2. The image reading device according to claim 1, further comprising a manuscript conveyance unit that conveys the manuscript at a capturing position of the image capturing unit,
    wherein the image pattern moves corresponding to a conveyance speed of the manuscript, and
    the correction instruction unit generates at least the correction instruction information for correcting image distortion due to fluctuations in conveyance speed of the manuscript.

3. The image reading device according to claim 1, further comprising:
    an optical source that irradiates a surface of the manuscript with light obliquely; and
    a lining member mounted to a position separate from a conveyance path of the manuscript in the vicinity of the capturing position of the image capturing unit,
    wherein the image pattern is displayed on the lining member, and
    the region determination unit determines the image region based on the image element corresponding to the shadow of the manuscript projected onto the lining member and the image pattern displayed on the lining member.

4. The image reading device according to claim 1, further comprising:
    a manuscript conveyance unit that conveys the manuscript at a capturing position of the image capturing unit; and a light emitting unit that is mounted on the rear surface side of the manuscript as viewed from the image capturing unit and emits light corresponding to conveyance of the manuscript, wherein the image pattern is formed due to emission of light by the light emitting unit.

5. The image reading device according to claim 4, wherein the light emitting unit emits invisible light, and the image pattern is formed by the invisible light.

6. An image processing method for determining an image region of a captured image comprising the steps of:

extracting an image element corresponding to a predetermined image pattern from an captured image;

extracting another image element corresponding to a shadow of a manuscript from the captured image; and determining an image region corresponding to the manuscript in the captured image based on the extracted image element corresponding to the image pattern and the extracted image element corresponding to the shadow of the manuscript, wherein said extractions are performed by the image reading device of claim 1.

7. A non-transitory computer-readable medium storing thereon a computer program used in a computer, in which the program is used for determining an image region of a captured image, the computer program causing the computer to perform the steps of:

extracting an image element corresponding to a predetermined image pattern from an captured image;

extracting another image element corresponding to a shadow of a manuscript from the captured image; and determining an image region corresponding to the manuscript in the captured image based on the extracted image element corresponding to the image pattern and the extracted image element corresponding to the shadow of the manuscript, wherein said extractions are performed by the image reading device of claim 1.

\* \* \* \* \*